Aug. 22, 1939.  G. A. SWEET  2,170,166
METHOD OF MAKING CUTTING DIES AND BLADE STOCK THEREFOR
Filed Nov. 20, 1936
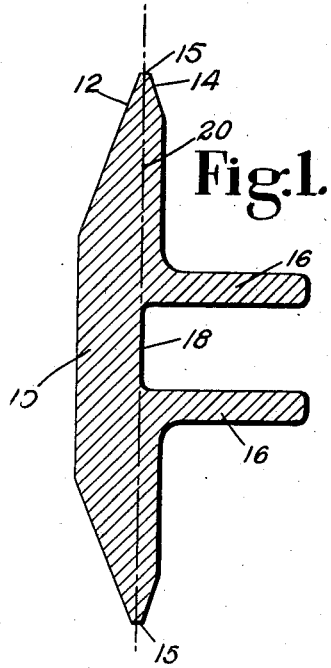
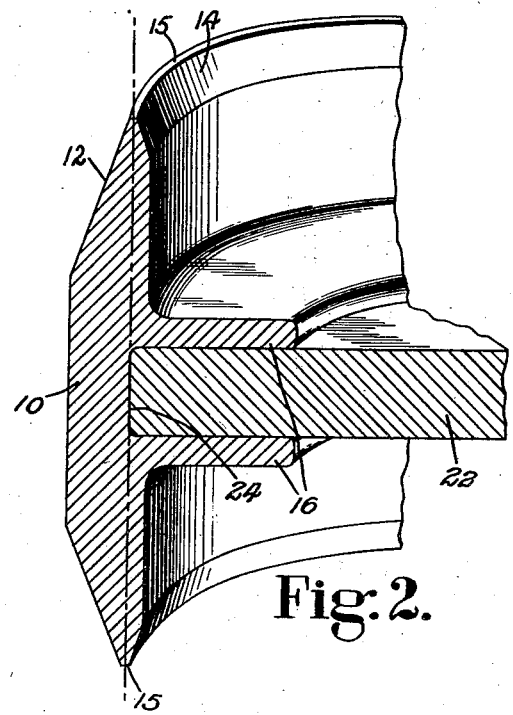
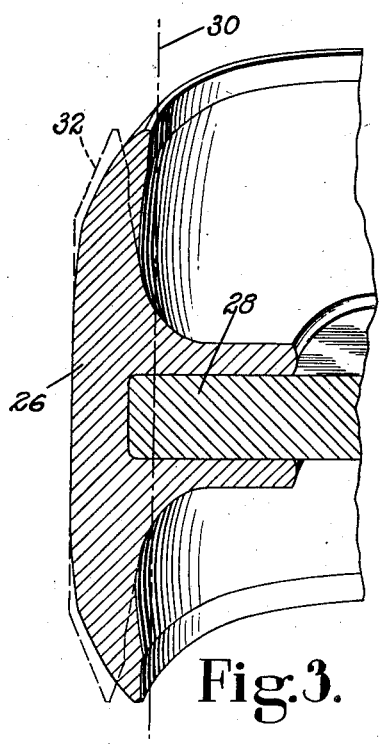
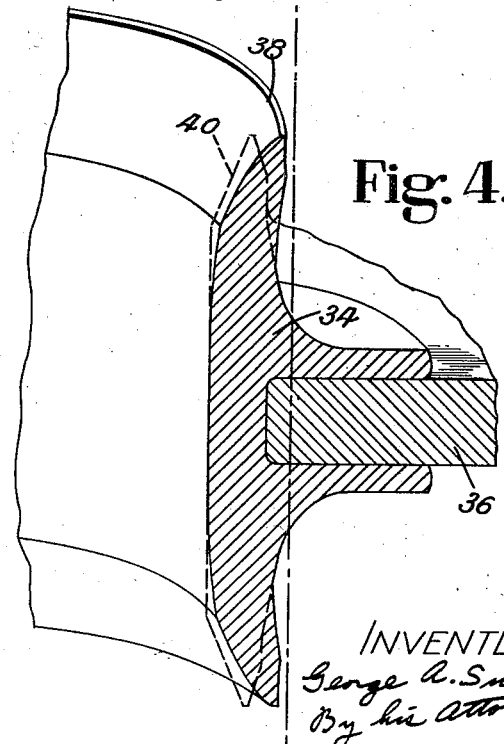
INVENTOR
George A. Sweet
By his attorney
Victor Cobb

Patented Aug. 22, 1939

2,170,166

UNITED STATES PATENT OFFICE 2,170,166

METHOD OF MAKING CUTTING DIES AND BLADE STOCK THEREFOR

George A. Sweet, Milford, Mass., assignor to United Shoe Machinery Corporation, Paterson, N. J., a corporation of New Jersey Application November 20, 1936, Serial No. 111,889

4 Claims. (Cl. 76—107)

This invention relates to dies and is herein illustrated as embodied in a die suitable for use in cutting blanks such as shoe part blanks from sheet material such as leather.

One type of cutting die which has come into extensive use in shoe factories is that disclosed in United States Letters Patent No. 2,040,172, granted May 12, 1936, upon an application filed in the name of F. L. Foster. Such dies commonly comprise a core of sheet material corresponding in outline to that of a blank to be cut and have bent along the edge portions of the core a cutting blade which, as illustrated in the patent referred to, has two oppositely disposed cutting edges. In the manufacture of such dies considerable difficulty has been experienced in bending the stock around the core by reason of the fact that in bending the blade along sharp curves the cutting edge portion of the blade will be moved too far inwardly or outwardly relatively to the adjacent edge portion of the core with the result that the cutting edges do not conform as closely as they should to the shape of the core or rather to the shape of the blanks which it is desired to produce by the die. This necessitates an additional operation of truing up the cutting edge to conform with the core or of grading the core prior to assembly in a die in order to compensate for the distortion of the cutting edge during the bending operation.

In view of the foregoing, it is an object of the invention to provide improved cutting die blade stock of a cross section which will obviate the difficulties aforementioned. To this end, and as illustrated, I have provided blade stock comprising a body portion which terminates in a cutting edge and of such cross section that the axis about which the stock is to be bent passes through the cutting edge. Blade stock so shaped can be bent along the core of sheet material with little distortion of the cutting edge of the stock relatively to the edge of the core. Preferably, and as shown, I utilize such blade stock in order to produce a die in which there is a core the periphery of which corresponds in outline to that of a blank to be produced and having a blade bent along the edges of the core, the blade being welded or otherwise secured to the core by means of flanges projecting from the body portion of the blade and engaging opposite faces of the core. As shown, the blade stock is of such section that in the completed die the cutting edges will be in alinement with edge portions of the core. This construction is particularly advantageous in that in the bending of the blade stock about the core the cutting edge thereof can be bent sharply in following the contour of the core with assurance that the cuting edge will correspond closely to the shape of the edge of the core.

The invention further contemplates an improved method of producing cutting dies which consists in bending blade stock such as that above mentioned about the periphery of a core corresponding in shape to a blank to be cut while utilizing the edge of the core as a guide, and securing the flanges to the core.

These and other features of the invention are disclosed in the accompanying drawing, are described in detail in the following specification, and will be pointed out in the claims.

In the drawing,

Fig. 1 represents a cross section, on enlarged scale, through a piece of blade stock constructed in accordance with one embodiment of my invention;

Fig. 2 is a perspective view, on enlarged scale, partly in section, illustrating a portion of a die formed with my improved blade stock; and Figs. 3 and 4 are perspective views, on enlarged scale, of portions of dies illustrating the difficulties heretofore experienced in bending blade stock around cores.

As shown in Fig. 1, my improved blade stock comprises a comparatively flat ribbon of steel having a body portion 10 opposite edge portions of which are beveled, as shown at 12 and 14, to form cutting edge portions 15 and having laterally projecting flange portions 16. The body portion 10 is recessed at 18 between the flanges so that the wall of the recess extends in line with the cutting edge portions 15 of the blade. The section is so shaped that a line through its center of gravity also passes through the cutting edges and along the inner wall of the recess. The dot-and-dash line 20 represents this gravity axis which corresponds closely to the neutral axis of the section. As the result of this, when the stock is bent in direction at right angles to a plane tangent to the edge of the core, the edge portions 15 will not be severely distorted but will continue to remain substantially in line with the wall of the recess 18 and the edges of the core.

In utilizing the stock to form a die, I bend the blade stock about the periphery of a core 22 which is shaped to correspond to the outline of the blank to be produced. The edge portion 24 of the core is brought into engagement with the wall 18 and the stock is bent along such edge portion entirely around the core, the flanges 16 overlying the opposite faces of the core. After this the flanges are secured to the core, preferably by a welding operation.

I have illustrated diagrammatically in Figs. 3 and 4 the effect of bending blade stock about a core where the blade stock is not shaped so that the neutral axis of its cross section passes through the cutting edges and the edge of the core. As shown in Fig. 3, a blade 26 was bent around a core 28, the neutral axis of the blade section being indicated by the line 30. In this case the blade was bent around a convex portion of the core, the blade being deformed inwardly as it was bent along the curve out of the position which it should occupy as indicated by the dotted line 32. In Fig. 4 I have illustrated a similar condition, except that a blade 34 is bent along a reentrant portion of a core 36 with the result that the cutting edge 38 is bent inwardly away from the position which it should occupy as indicated by the dotted line 40. On the other hand, in the present instance, it is to be noted that the edge 24 of the core 22 lies in the neutral axis passing through the cutting edges with the result that, as the blade stock is bent along the core, since little or no stress is applied to those portions of the blade lying along the neutral axis of the section, the cutting edges will remain in alinement with the edge of the core with the result that the shape of the cutting edges will correspond closely to that of the core.

Having described my invention, what I claim as new and desire to secure by Letters Patent of the United States is:

1. Cutting die blade stock comprising a strip of metal having a body portion terminating in oppositely disposed cutting edge portions, said body portion having a recess therein extending longitudinally thereof, the stock being of a cross section so shaped that the cutting edge portions are in alinement with the inner wall of the recess and the center of gravity of the section.

2. Cutting die blade stock having a body portion terminating in a cutting edge, and spaced flanges projecting laterally from the body portion, the blade stock being so shaped in section that a line through the center of gravity of the section passes through the cutting edge and lies in the face of the body portion between the flanges.

3. A method of producing dies which consists in providing a core of sheet material the periphery of which corresponds to that of a blank to be cut, providing a strip of blade stock having a body portion terminating in oppositely disposed cutting edges and having a recess therein the inner wall of which is in alinement with the cutting edges and the center of gravity of the section, progressively bending said inner wall into engagement with the periphery of the core about successive axes all of which pass through the cutting edges, the inner wall of the recess and the center of gravity, and securing the strip to the core.

4. A method of producing dies which consists in providing a core of sheet material the periphery of which corresponds to that of a blank to be cut, providing a strip of blade stock having a body portion terminating in oppositely disposed cutting edges, and having a recess therein the inner wall of which extends along a line passing through the center of gravity of the section and through the cutting edges, progressively bending the strip along the core with the inner wall of the recess in engagement with the core, and securing the strip to the core.

GEORGE A. SWEET.